United States Patent
Xie et al.

(10) Patent No.: US 9,020,364 B2
(45) Date of Patent: Apr. 28, 2015

(54) OPTICAL RECEIVER HAVING A SIGNAL-EQUALIZATION CAPABILITY

(71) Applicant: Alcatel-Lucent, Paris (FR)

(72) Inventors: Chongjin Xie, Morganville, NJ (US); Peter J. Winzer, Aberdeen, NJ (US); Stefan Weisser, Nuremberg (DE); Andreas Leven, Bietigheim-Bissingen (DE)

(73) Assignee: Alcatel Lucent, Boulogne-Billancourt (FR)

( * ) Notice: Subject to any disclaimer, the term of this patent is extended or adjusted under 35 U.S.C. 154(b) by 281 days.

(21) Appl. No.: 13/628,412

(22) Filed: Sep. 27, 2012

(65) Prior Publication Data

US 2014/0086594 A1    Mar. 27, 2014

(51) Int. Cl.
    *H04B 10/61*    (2013.01)
(52) U.S. Cl.
    CPC ........ *H04B 10/6161* (2013.01); *H04B 10/6162* (2013.01); *H04B 10/6165* (2013.01)
(58) Field of Classification Search
    CPC ... H04B 10/611; H04B 10/613; H04B 10/616
    USPC ........................................................ 398/202
    See application file for complete search history.

(56) References Cited

U.S. PATENT DOCUMENTS

| | | | |
|---|---|---|---|
| 6,683,855 B1 | 1/2004 | Bordogna et al. | |
| 7,212,741 B2 | 5/2007 | Myong et al. | |
| 7,266,310 B1 | 9/2007 | Savory et al. | |
| 7,382,984 B2 | 6/2008 | McNicol et al. | |
| 7,424,651 B2 | 9/2008 | Domagala et al. | |
| 7,532,820 B2 | 5/2009 | Aronson | |
| 7,570,889 B2 | 8/2009 | Shastri et al. | |
| 7,574,146 B2 | 8/2009 | Chiang et al. | |
| 7,636,525 B1 | 12/2009 | Bontu et al. | |
| 7,734,191 B1 | 6/2010 | Welch et al. | |
| 7,747,177 B2 | 6/2010 | Chen et al. | |
| 8,260,154 B2 | 9/2012 | Chang et al. | |

(Continued)

OTHER PUBLICATIONS

Krummrich, Peter M., "Optical Amplification and Optical Filter Based Signal Processing for Cost and Energy Efficient Spatial Multiplexing," Optical Society of America, Optics Express, Aug. 15, 2011, vol. 19, No. 17 (17 pages).

(Continued)

*Primary Examiner* — Nathan Curs
(74) *Attorney, Agent, or Firm* — Mendelsohn, Drucker & Dunleavy, P.C.; Yuri Gruzdkov

(57) ABSTRACT

In one embodiment, an optical receiver has a bulk dispersion compensator and a butterfly equalizer serially connected to one another to perform dispersion-compensation processing and electronic polarization de-multiplexing. The bulk dispersion compensator has a relatively large dispersion-compensation capacity, but is relatively slow and operates in a quasi-static configuration. The butterfly equalizer has a relatively small dispersion-compensation capacity, but can be dynamically reconfigured on a relatively fast time scale to track the changing conditions in the optical-transport link. The optical receiver has a feedback path that enables the configuration of the bulk dispersion compensator to be changed based on the configuration of the butterfly equalizer in a manner that advantageously enables the receiver to tolerate larger amounts of chromatic dispersion and/or polarization-mode dispersion than without the use of the feedback path.

21 Claims, 6 Drawing Sheets

(56) References Cited

U.S. PATENT DOCUMENTS

| | | |
|---|---|---|
| 2007/0297806 A1 | 12/2007 | Kaneda et al. |
| 2008/0152361 A1 | 6/2008 | Chen et al. |
| 2011/0038631 A1 | 2/2011 | Doerr |
| 2011/0200339 A1* | 8/2011 | Komaki et al. ............... 398/208 |
| 2011/0249971 A1* | 10/2011 | Oda et al. ..................... 398/65 |
| 2012/0057863 A1 | 3/2012 | Winzer et al. |
| 2012/0195602 A1* | 8/2012 | Nakashima et al. .......... 398/204 |
| 2013/0071124 A1 | 3/2013 | Xie et al. |
| 2013/0183034 A1* | 7/2013 | Zhang et al. .................... 398/46 |
| 2013/0209089 A1* | 8/2013 | Harley et al. ................... 398/25 |
| 2013/0230312 A1 | 9/2013 | Randel et al. |
| 2013/0259490 A1* | 10/2013 | Malouin et al. ............... 398/152 |
| 2014/0029959 A1* | 1/2014 | Koizumi et al. ............. 398/208 |
| 2014/0212149 A1* | 7/2014 | Khandani et al. ............. 398/152 |

OTHER PUBLICATIONS

Kuschnerov, Maxim, et al., "DSP for Coherent Single-Carrier Receivers," Journal of Lightwave Technology, Aug. 15, 2009, vol. 27, No. 16, pp. 3614-3622.

Portela, Thiago F., et al., "Analysis of Signal Processing Techniques for Optical 112 Gb/s DP-QPSK Receivers with Experimental Data," Journal of Microwaves, Optoelectronics and Electromagnetic Applications, Jun. 2011, vol. 10, No. 1, pp. 155-164.

Selmi Mehrez, "Advanced Digital Signal Processing tools for QAM-based optical fiber communications," PhD thesis, Telecom ParisTech, Oct. 2011 (119 pages).

Xie, Chongjin, "Impact of Nonlinear and Polarization Effects in Coherent Systems," Optical Society of America, Optics Express, Dec. 12, 2011, vol. 19, No. 26 (16 pages).

\* cited by examiner

100

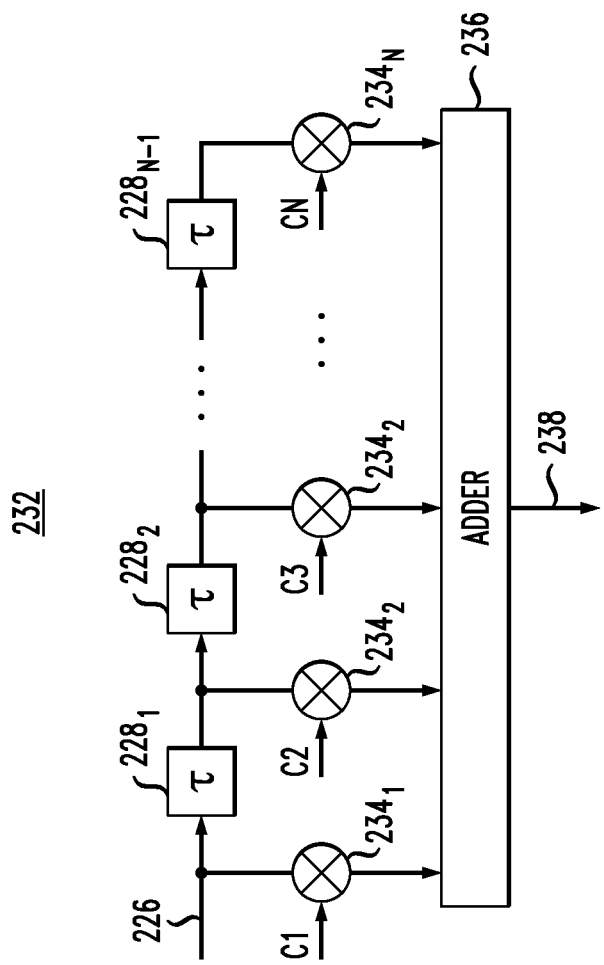

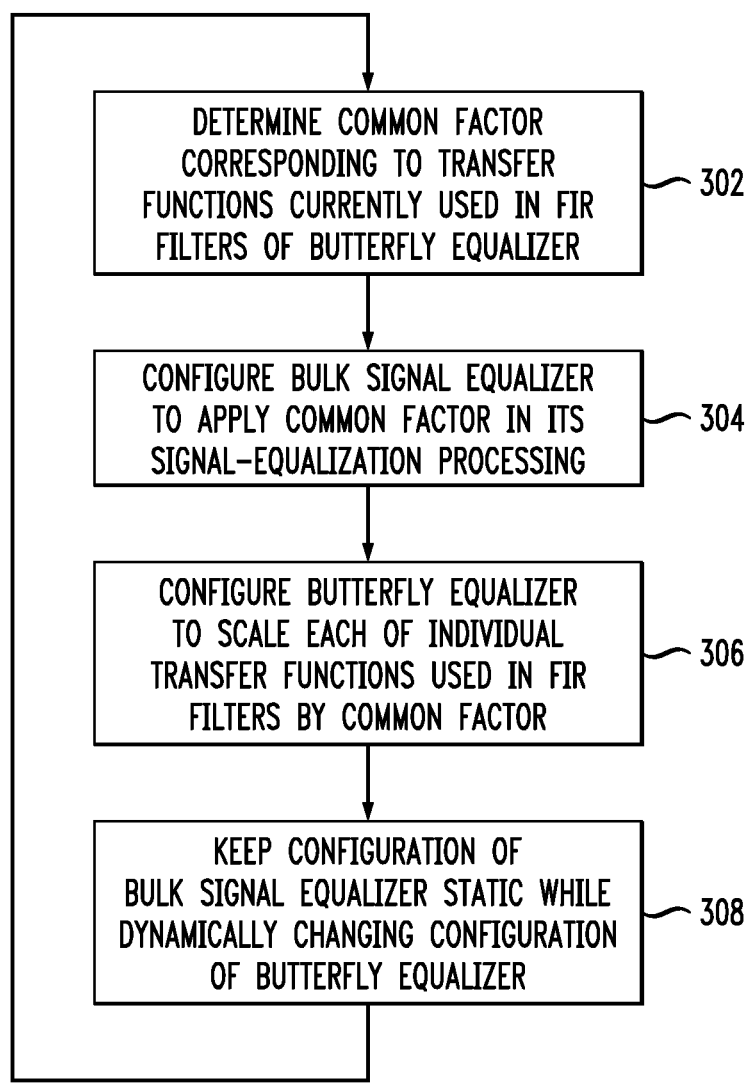

500

OPTICAL RECEIVER HAVING A SIGNAL-EQUALIZATION CAPABILITY

BACKGROUND

1. Field

The present disclosure relates to optical communication equipment and, more specifically but not exclusively, to optical receivers having signal-equalization means, such as for mitigating the detrimental effects of chromatic and/or polarization-mode dispersion.

2. Description of the Related Art

This section introduces aspects that may help facilitate a better understanding of the invention(s). Accordingly, the statements of this section are to be read in this light and are not to be understood as admissions about what is in the prior art or what is not in the prior art.

The next-generation of optical communication systems is being designed for relatively high data-transmission rates, e.g., higher than about 100 Gbit/s per channel. At these rates, the effects of chromatic dispersion (CD) and polarization-mode dispersion (PMD) can significantly degrade the transmission performance of optical-transport links. Accordingly, methods for mitigating these detrimental effects are being developed for use in optical-communication systems.

SUMMARY OF SOME SPECIFIC EMBODIMENTS

Disclosed herein is an optical receiver that, in one embodiment, has a bulk dispersion compensator and a butterfly equalizer serially connected to one another to perform dispersion-compensation processing and electronic polarization de-multiplexing. The bulk dispersion compensator has a relatively large dispersion-compensation capacity, but is relatively slow and operates in a quasi-static configuration. The butterfly equalizer has a relatively small dispersion-compensation capacity, but can be dynamically reconfigured on a relatively fast time scale to track the changing conditions in the optical-transport link. The optical receiver has a feedback path that enables the configuration of the bulk dispersion compensator to be changed based on the configuration of the butterfly equalizer in a manner that advantageously enables the receiver to tolerate larger amounts of chromatic dispersion (CD) and/or polarization-mode dispersion (PMD) than without the use of the feedback path.

According to one embodiment, provided is an apparatus comprising an optical-to-electrical converter configured to mix an optical input signal having a first polarization component and a second polarization component with an optical local-oscillator (LO) signal to generate a first plurality of electrical digital measures of the optical input signal; and a digital processor configured to process the first plurality of electrical digital measures to recover respective data carried by the first polarization component and the second polarization component of the optical input signal. The digital processor comprises a first signal equalizer configured to apply signal-equalization processing to the first plurality of electrical digital measures to generate a second plurality of electrical digital measures of the optical input signal; and a second signal equalizer configured to apply further signal-equalization processing to the second plurality of electrical digital measures. The digital processor is configured to change one or more parameters of the signal-equalization processing in the first signal equalizer based on one or more parameters of the further signal-equalization processing in the second signal equalizer.

According to another embodiment, provided is an apparatus comprising a digital processor configured to (i) receive a first plurality of electrical digital measures generated by mixing an optical input signal having a first polarization component and a second polarization component with an optical local-oscillator signal and (ii) process the first plurality of electrical digital measures to recover respective data carried by the first polarization component and the second polarization component of the optical input signal. The digital processor comprises a first signal equalizer configured to apply signal-equalization processing to the first plurality of electrical digital measures to generate a second plurality of electrical digital measures of the optical input signal; a second signal equalizer configured to apply further signal-equalization processing to the second plurality of electrical digital measures; a decoder configured to recover the respective data based on the second plurality of electrical digital signals; and a controller configured to change one or more parameters of the signal-equalization processing in the first signal equalizer based on one or more parameters of the further signal-equalization processing in the second signal equalizer.

According to yet another embodiment, provided is a method of processing a first plurality of electrical digital measures generated by mixing an optical input signal having a first polarization component and a second polarization component with an optical local-oscillator signal for recovering respective data carried by the first polarization component and the second polarization component of the optical input signal. The method comprises the steps of: applying signal-equalization processing to the first plurality of electrical digital measures in a first signal equalizer to generate a second plurality of electrical digital measures of the optical input signal; applying further signal-equalization processing to the second plurality of electrical digital measures a second signal equalizer; changing one or more parameters of the signal-equalization processing in the first signal equalizer based on one or more parameters of the further signal-equalization processing in the second signal equalizer; and recovering the respective data based on the second plurality of electrical digital signals.

BRIEF DESCRIPTION OF THE DRAWINGS

Other aspects, features, and benefits of various embodiments of the invention will become more fully apparent, by way of example, from the following detailed description and the accompanying drawings, in which:

FIGS. 2A-2B show block diagrams of a digital signal processor that can be used in the coherent optical receiver of FIG. 1 according to one embodiment of the disclosure;

FIG. 3 shows a flowchart of a method of configuring the bulk signal equalizer and butterfly equalizer in the digital signal processor of FIG. 2 according to one embodiment of the disclosure;

DETAILED DESCRIPTION

Figure 1:
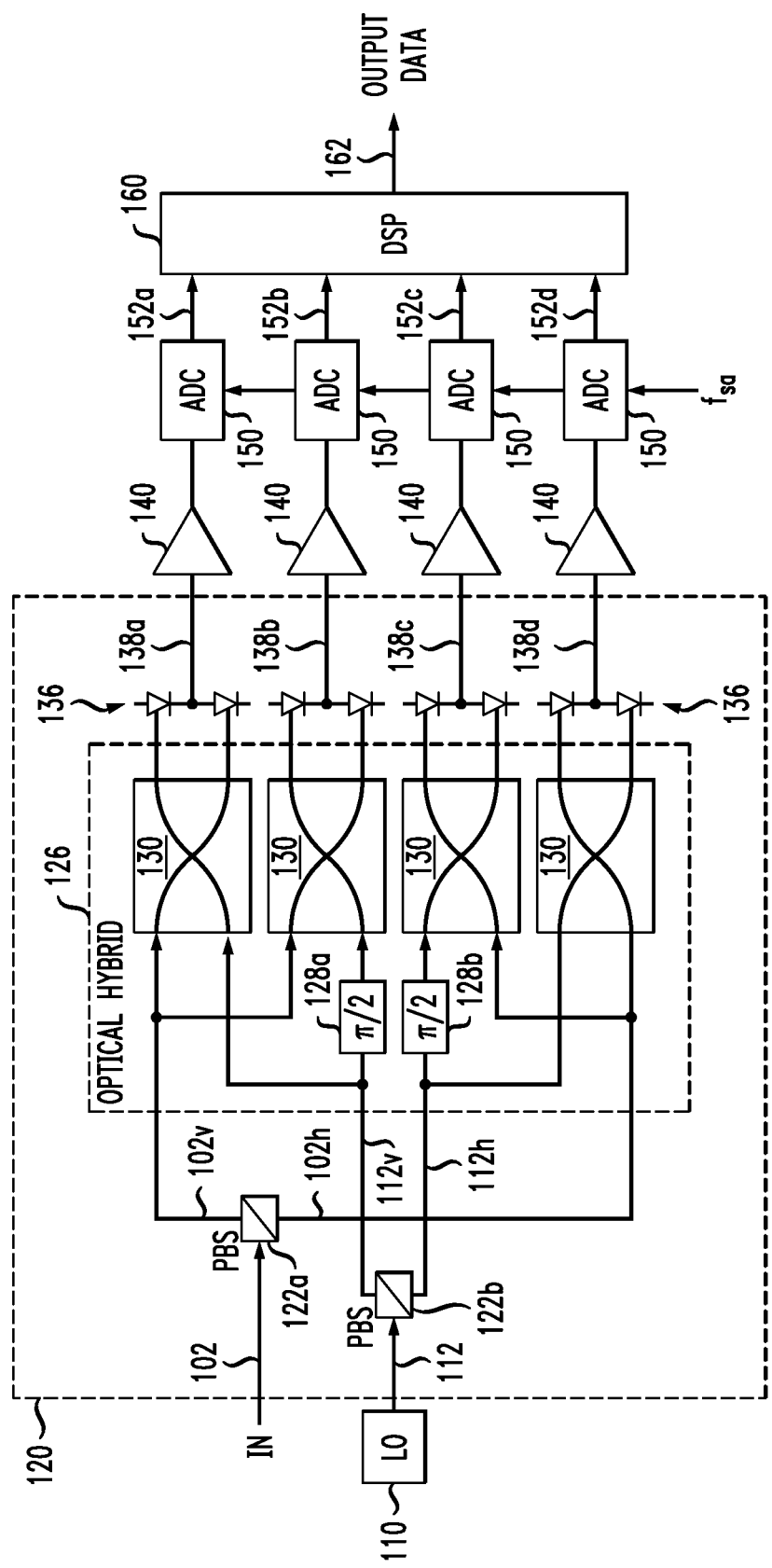
FIG. 1 shows a block diagram of a coherent optical receiver according to one embodiment of the disclosure.

FIG. 1 shows a block diagram of a coherent optical receiver 100 according to one embodiment of the disclosure. Receiver 100 receives a polarization-multiplexed modulated optical signal 102, e.g., from a remote transmitter, via an external optical communication link (not explicitly shown in FIG. 1). Optical signal 102 is applied to an optical-to-electrical (O/E) converter 120 that converts that optical signal into four electrical signals 138a-138d. Each of signals 138a-138d may be amplified in a corresponding amplifier 140 coupled to a corresponding analog-to-digital converter (ADC) 150. Each ADC 150 samples the output of a corresponding amplifier 140 at an appropriate sampling frequency to produce a corresponding one of four digital signals 152a-152d. Digital signals 152a-152d are applied to a digital signal processor (DSP) 160 that processes them, e.g., as described in more detail below in reference to FIGS. 2-3, to recover the data streams originally encoded onto the polarization components of optical signal 102 at the remote transmitter. DSP 160 outputs the recovered data via an output signal 162.

In one embodiment, receiver 100 may include a set of electrical low-pass filters (not explicitly shown in FIG. 1), each inserted between O/E converter 120 and the respective one of ADCs 150. The use of these filters may help to reduce noise and prevent aliasing.

O/E converter 120 implements a polarization-diversity intradyne-detection scheme using an optical local-oscillator (LO) signal 112 generated by a laser source 110. In one embodiment, O/E converter 120 is an integrated planar waveguide circuit. Polarization beam splitters (PBSs) 122a-b decompose signals 102 and 112, respectively, into two respective orthogonally polarized components, illustratively vertically polarized components 102v and 112v and horizontally polarized components 102h and 112h. These polarization components are then directed to an optical hybrid 126.

In optical hybrid 126, each of polarization components 102v, 112v, 102h, and 112h is split into two (attenuated) copies, e.g., using a conventional 3-dB power splitter (not explicitly shown in FIG. 1). A relative phase shift of about 90 degrees ($\pi/2$ radian) is then applied to one copy of component 112v and one copy of component 112h using phase shifters 128a-128b, respectively. The various copies of signals 102v, 112v, 102h, and 112h are optically mixed with each other as shown in FIG. 1 using four optical signal mixers 130, and the mixed signals produced by the mixers are detected by eight photo-detectors (e.g., photodiodes) 136. Photo-detectors 136 are arranged in pairs, as shown in FIG. 1, and the output of each photo-detector pair is a corresponding one of electrical signals 138a-138d. This configuration of photo-detectors 136 is a differential configuration that helps to reduce noise and improve DC balancing. In an alternative embodiment, O/E converter 120 can have four photo-detectors 136, one per optical signal mixer 130, configured for single-ended detection of the corresponding optical signals. In yet another alternative embodiment, optical hybrid 126 may be replaced by a 3×3 optical coupler having three photodiodes per polarization at its output, e.g., described in (i) U.S. patent application Ser. No. 13/537,467, by Chongjin Xie and Peter Winzer, filed on Jun. 29, 2012, and entitled "Coherent Optical Receivers For Colorless Reception" and (ii) a paper by Chongjin Xie, Peter J. Winzer, Gregory Raybon, et al. "Colorless Coherent Receiver Using 3×3 Coupler Hybrids and Single-Ended Detection," OPTICS EXPRESS, 2012, Vol. 20, No. 2, pp. 1164-1171, both of which are incorporated herein by reference in their entirety.

Exemplary optical hybrids that are suitable for use in optical receiver 100 are described, e.g., in U.S. Patent Application Publication Nos. 2007/0297806 and 2011/0038631, both of which are incorporated herein by reference in their entirety.

In a representative embodiment, DSP 160 performs (i) signal equalization and (ii) carrier- and data-recovery (CDR) processing. Signal equalization is generally directed at reducing the detrimental effects of various signal impairments imparted onto optical signal 102 in the optical-transport link. Such signal impairments might include, but are not limited to polarization distortion (PD), chromatic dispersion (CD), polarization-mode dispersion (PMD), additive noise, and other linear and nonlinear forms of signal distortion. One skilled in the art will appreciate that these signal impairments might accrue in the optical-transport link through either localized or distributed mechanisms, or through a combination of both types of mechanisms. The CDR processing is generally directed at reducing the detrimental effects of the various impairments to enable receiver 100 to recover the transmitted data with a relatively low bit-error rate (BER).

Figure 2A:
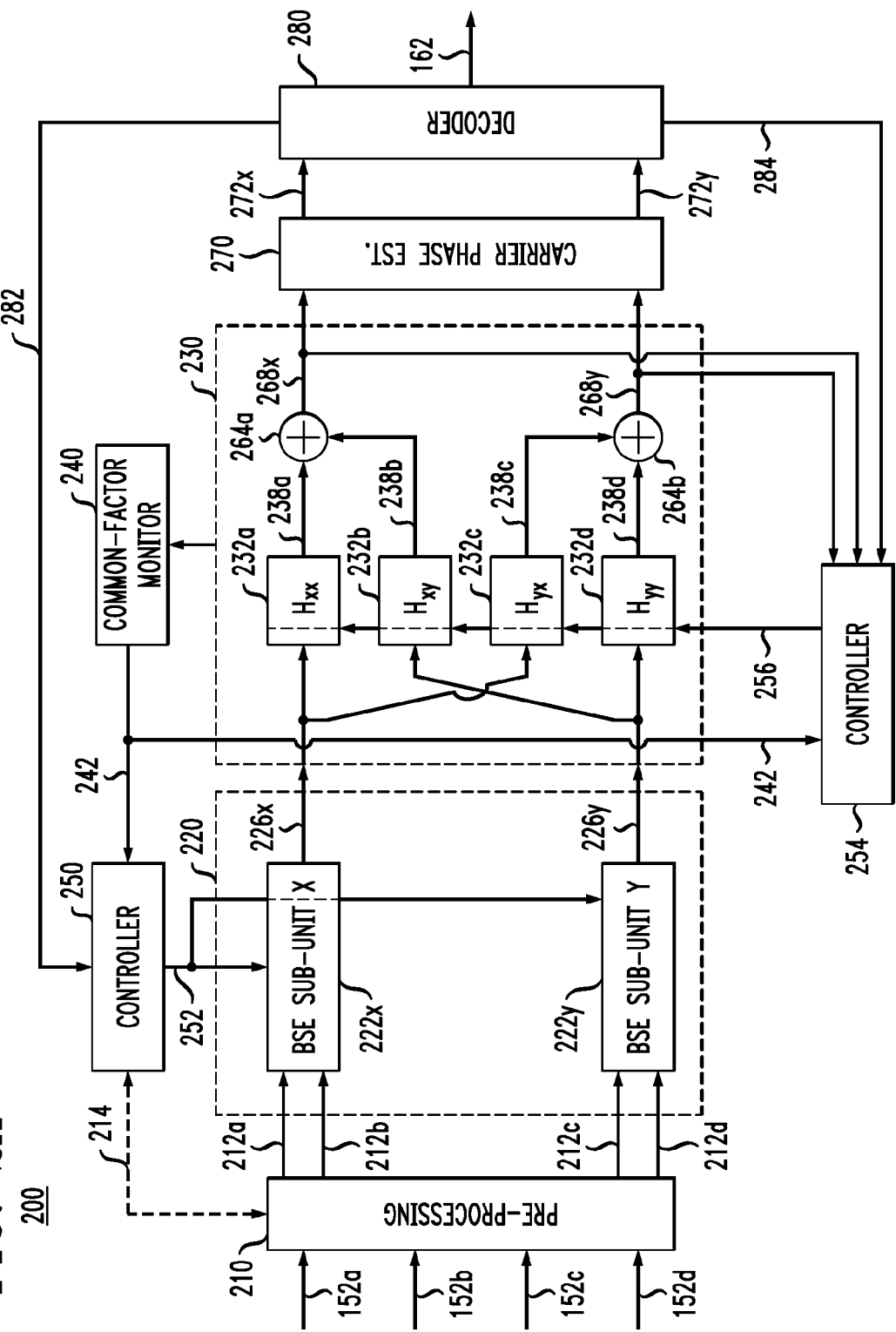

FIGS. 2A-2B show block diagrams of a DSP 200 that can be used to implement DSP 160 (FIG. 1) according to one embodiment of the disclosure. More specifically, FIG. 2A shows an overall block diagram of DSP 200. FIG. 2B shows a block diagram of a finite-impulse-response (FIR) filter 232, four instances of which are used in DSP 200. DSP 200 is illustratively shown in FIG. 2A as (i) receiving digital signals 152a-152d and (ii) generating output signal 162 (also see FIG. 1).

Ideally, digital signals 152a-152b represent the I and Q components, respectively, of the first polarization component (e.g., X) of the original optical communication signal generated by the remote transmitter, and digital signals 152c-152d represent the I and Q components, respectively, of the second polarization component (e.g., Y) of that optical communication signal. However, optical-link impairments, receiver-implementation imperfections, and configuration inaccuracies generally cause each of digital signals 152a-152d to be a convoluted signal that has various signal distortions and/or contributions from both of the original (e.g., independently modulated) polarization components. The train of signal processing implemented in DSP 200 is generally directed at de-convolving digital signals 152a-152d so that the encoded data can be properly recovered to generate output signal 162.

DSP 200 has a signal-pre-processing module 210 configured to receive digital signals 152a-152d. One function of module 210 is to adapt the rate of signal samples in digital signals 152a-152d to a rate suitable for the signal-processing algorithms implemented in the downstream modules of DSP 200. For example, in a representative embodiment, each of digital signals 152a-152d is a digital measure of optical input signal 102 having a respective stream of digital samples that occur at the sampling frequency of ADCs 150 (see FIG. 1). Module 210 operates to appropriately retime and/or resample digital signals 152a-152d to generate digital signals 212a-212d in which digital samples occur at a rate that is synchronized with the symbol rate in optical input signal 102 (FIG. 1), e.g., by being an integer multiple of the latter rate.

In one embodiment, module 210 may also be configured to reduce signal distortions imposed by O/E converter 120 (see FIG. 1). Said distortions may be caused, e.g., by incorrect biasing of various electro-optical components in O/E converter 120; imperfect signal splitting in power and polarization splitters and optical couplers; frequency dependence and variability of the O/E conversion characteristics of photo-detectors 136, etc. Representative signal-processing methods that can be implemented in module 210 for this purpose are disclosed, e.g., in commonly owned U.S. Patent Application Publication No. 2012/0057863, which is incorporated herein by reference in its entirety.

Signal-equalization processing in DSP 200 is carried out using two modules: a bulk signal equalizer (BSE) 220 and a butterfly equalizer 230. In one embodiment, bulk signal equalizer 220 can be a bulk dispersion compensator. Representative examples of dispersion compensators that can be used to implement bulk signal equalizer 220 are disclosed, e.g., in U.S. Pat. Nos. 8,260,154, 7,636,525, 7,266,310, all of which are incorporated herein by reference in their entirety.

The operation of bulk signal equalizer 220 and butterfly equalizer 230 is described in more detail below. Briefly, DSP 200 has controllers 250 and 254 configured to control the configurations of bulk signal equalizer 220 and butterfly equalizer 230, respectively. Controller 250 configures bulk signal equalizer 220 based on two different feedback signals. One of these feedback signals (labeled 282 in FIG. 2A) is received from a decoder 280, and the other feedback signal (labeled 242 in FIG. 2A) is received from a common-factor monitor 240. While selecting configuration parameters for bulk signal equalizer 220, controller 250 may also take into account the type and amount of signal preprocessing performed in module 210, as indicated in FIG. 2A by a dashed arrow 214 showing a communication path between controller 250 and module 210. Controller 254 configures butterfly equalizer 230 based on (i) a feedback signal 284 received from decoder 280 and (ii) digital output signals 268x and 268y generated by butterfly equalizer 230 itself. In one embodiment, each of controllers 250 and 254 can be a corresponding part of the same multifunctional control unit (not explicitly shown in FIG. 2A).

In one embodiment, bulk signal equalizer 220 has two generally analogous BSE sub-units: BSE sub-unit 222x and BSE sub-unit 222y. Sub-unit 222x applies signal-equalization processing to digital signals 212a and 212b, thereby transforming them into a (complex-valued) digital signal 226x. Sub-unit 222y similarly applies signal-equalization processing to digital signals 212c and 212d, thereby transforming them into a (complex-valued) digital signal 226y. The configurations of sub-units 222x and 222y are quasi-static and are selected so as to cause bulk signal equalizer 220 to compensate for a relatively large portion of certain signal impairments (such as, without limitation, one or more of PMD, polarization-dependent loss (PDL), inter-symbol interference (ISI), and CD) imposed on optical signal 102 in the optical-transport link. In this context, the term "quasi-static" means that controller 250 uses a control signal 252 to update (change) the respective configurations of sub-units 222x and 222y significantly less frequently than controller 254 uses a control signal 256 to update (change) the configuration of butterfly equalizer 230. For example, controller 250 might use control signal 252 to change the configurations of sub-units 222x and 222y about one time per second, or about one time per minute, or perhaps even less frequently. In contrast, controller 254 might use control signal 256 to change the configuration of butterfly equalizer 230 about one time per millisecond, or about one time per microsecond, or perhaps even more frequently.

Butterfly equalizer 230 is configured to perform (i) polarization de-multiplexing and (ii) signal processing directed at further reducing the adverse effects of certain signal impairments, such as PMD, polarization-dependent loss (PDL), inter-symbol interference (ISI), and CD, including but not limited to the portions of these or other impairments that are left uncompensated after the signal-equalization processing implemented in bulk signal equalizer 220. More specifically, butterfly equalizer 230 mixes digital signals 226x and 226y, using FIR filters 232a-232d and adders 264a and 264b, to convert those signals into digital signals 268x and 268y in accordance with Eqs. (1a) and (1b):

$$X'(k) = h_{xx}(k)*X(k) + h_{xy}(k)*Y(k) \tag{1a}$$

$$Y'(k) = h_{yx}(k)*X(k) + h_{yy}(k)*Y(k) \tag{1b}$$

where X'(k) is the value carried by digital signal 268x in the k-th time slot; Y'(k) is the value carried by digital signal 268y in the k-th time slot; X(k) is the value carried by digital signal 226x in the k-th time slot; Y(k) is the value carried by digital signal 226y in the k-th time slot; the "*" symbol denotes the convolution operation; and $h_{xx}(k)$, $h_{xy}(k)$, $h_{yx}(k)$, and $h_{yy}(k)$ are the impulse responses of FIR filters 232a-232d, respectively. In general, impulse responses $h_{xx}(k)$, $h_{yx}(k)$, $h_{xy}(k)$, and $h_{yy}(k)$ are selected for digital signals 268x and 268y to represent the first and second polarization components, respectively, of the original polarization-division-multiplexed signal generated by the remote transmitter, with a minimal amount of inter-polarization crosstalk.

As indicated in FIG. 2B, each of FIR filters 232a-232d can be implemented as an N-tap FIR filter comprising (i) N−1 delay elements $228_1$-$228_{N-1}$; (ii) N multipliers $234_1$-$234_N$; and (iii) an adder 236. Each of delay elements $228_1$-$228_{N-1}$ introduces a time delay τ. Each of multipliers $234_1$-$234_N$ multiplies a corresponding delayed copy of signal 226 by a respective coefficient $c_i$, where i=1, 2, ..., N. Adder 236 then sums the output signals generated by multipliers $234_1$-$234_N$ to generate a filtered output signal 238. In the frequency domain, the transfer function H(f) corresponding to an individual FIR filter 232 can be expressed using Eq. (2):

$$H_\sigma(f) = \sum_{i=1}^{N} c_{\sigma i} e^{-j(i-1)\omega\tau} \tag{2}$$

where σ=xx, xy, yx, or yy; f is frequency; and ω=2πf. In operation, FIR filters 232a-232d are typically configured to use different respective sets of coefficients $c_1$-$c_N$. As already indicated above, the values of coefficients $c_1$-$c_N$ change over time and are set in each of FIR filters 232a-232d by controller 254 via control signal 256.

Controller 250 generates control signal 252 based on feedback signal 282. Feedback signal 282 typically carries one or more error metrics that can be used in error-minimization-driven algorithms that enable controller 250 to appropriately configure bulk signal equalizer 220, e.g., for the purpose of reducing the BER in output signal 162. In one embodiment, communication path 214 can be used, e.g., to estimate the amount of CD in the input signal to help controller 250 appropriately set the configuration of the bulk signal equalizer 220.

Controller 254 generates control signal 256 based on an error metric obtained using feedback signal 284 and digital signals 268x and 268y. Various error-metric-based algorithms that can be used in controller 250 to determine and set the configuration of bulk signal equalizer 220 are disclosed, e.g., in U.S. Pat. Nos. 7,570,889, 7,532,820, and 7,382,984, all of which are incorporated herein by reference in their entirety. Two representative error-metric-based algorithms (e.g., a constant-modulus algorithm and a decision-directed least-mean-square (DD-LMS) algorithm), each suitable for calculating coefficients $h_1$-$h_N$ for each of FIR filters 232a-232d in butterfly equalizer 230, are described in detail, e.g., in an article by Thiago F. Portela, Diego V. Souto, Valery N. Rozental, et al., entitled "Analysis of Signal Processing Techniques for Optical 112 Gb/s DP-QPSK Receivers with Experimental Data," published in the Journal of Microwaves, Optoelectronics and Electromagnetic Applications, 2011, vol. 10, No. 1, pp. 155-164. The teachings of this article are also incorporated herein by reference in their entirety.

One problem with the use of two separate control circuits and two different algorithms for setting the respective configurations of bulk signal equalizer 220 and butterfly equalizer 230 is that those respective algorithms might not be optimally aligned or interfaced with one another. As a result, the overall signal-equalization performance of the signal-processing tandem consisting of bulk signal equalizer 220 and butterfly equalizer 230 may be suboptimal. This problem is addressed in DSP 200 by an additional feedback path comprising common-factor monitor 240. More specifically, feedback signal 242 generated by common-factor monitor 240 enables controller 250 to coordinate the operations of controllers 250 and 254 and the signal-equalization processing performed in bulk signal equalizer 220 and butterfly equalizer 230. This coordination advantageously enables DSP 200 to more-optimally utilize its signal-equalization capacity, e.g., as described below in reference to FIG. 4.

Digital signals 268x and 268y generated by butterfly equalizer 230 are applied to a carrier-phase-estimation (CPE) module 270. In a representative embodiment, CPE module 270 is configured to perform signal processing that mitigates the detrimental effects of (i) a carrier-frequency mismatch between LO signal 112 and input signal 102 (see FIG. 1) and (ii) the local-oscillator phase error. Various signal-processing techniques that can be used to implement frequency-mismatch compensation in CPE module 270 are disclosed, e.g., in U.S. Pat. No. 7,747,177 and U.S. Patent Application Publication No. 2008/0152361, both of which are incorporated herein by reference in their entirety. Representative signal-processing techniques that can be used to implement phase-error correction in CPE module 270 are disclosed, e.g., in U.S. patent application Ser. No. 13/410,747, filed on Mar. 2, 2012, and entitled "CORRECTION OF A LOCAL-OSCILLATOR PHASE ERROR IN A COHERENT OPTICAL RECEIVER," which patent application is incorporated herein by reference in its entirety.

Digital signals 272x and 272y generated by CPE module 270 are applied to decoder 280. Decoder 280 is configured to use the digital measures (e.g., complex values) conveyed by digital signals 272x and 272y to appropriately map each received symbol onto an operative constellation and, based on said mapping, recover the corresponding encoded data for output signal 162. In one embodiment, decoder 280 may perform digital processing that implements forward error correction (FEC) based on data redundancies (if any) in optical input signal 102. Many FEC methods suitable for use in decoder 280 are known in the art. Several representative examples of such methods are disclosed, e.g., in U.S. Pat. Nos. 7,734,191, 7,574,146, 7,424,651, 7,212,741, and 6,683,855, all of which are incorporated herein by reference in their entirety.

FIG. 3 shows a flowchart of a method 300 of configuring bulk signal equalizer 220 and butterfly equalizer 230 (FIG. 2) according to one embodiment of the disclosure.

At step 302 of method 300, common-factor monitor 240 determines common factor $H_0$ corresponding to the transfer functions $H_{xx}$, $H_{xy}$, $H_{yx}$, and $H_{yy}$ that are being used in FIR filters 232a-232d. As is further evident from the examples below, common factor $H_0$ is generally a function that may be analogous to transfer functions $H_{xx}$, $H_{yx}$, $H_{xy}$, and $H_{yy}$. One skilled in the art will understand that common factor $H_0$ can have a time-domain representation (e.g., corresponding to the schematics shown in FIG. 2B) or an equivalent frequency-domain representation (see, e.g., Eq. (2)). Situations in which common factor $H_0$ is a scalar value, e.g., during some periods of time, are also possible.

In some embodiments, common-factor monitor 240 can determine common factor $H_0$, e.g., by extracting the quadratic term of the phase(s) corresponding to FIR filters 232a-232d, thereby estimating the residual CD, and then transferring information about the estimated residual CD to controller 250 for adjusting the configuration of bulk signal equalizer 220 accordingly, with the net result being a reduction in the amount of the residual CD that butterfly equalizer 230 has to deal with. In some other embodiments, common-factor monitor 240 can determine common factor $H_0$, e.g., by examining the magnitude and phase of transfer functions $H_{xx}$, $H_{yx}$, $H_{xy}$, and $H_{yy}$ over some period in time, and then transferring, to controller 250, information about those (quasi-static) parts of transfer functions $H_{xx}$, $H_{yx}$, $H_{xy}$, and $H_{yy}$ that do not change by more than a specified amount over that period of time. Controller 250 can then use this information to configure bulk signal equalizer 220 to implement signal processing corresponding to at least a portion of the quasi-static parts of transfer functions $H_{xx}$, $H_{yx}$, $H_{xy}$, and $H_{yy}$.

In one configuration, common-factor monitor 240 is configured to determine common factor $H_0$ in accordance with Eq. (3):

$$H_0 = H_\sigma \quad (3)$$

where σ=xx, xy, yx, or yy. In other words, in this configuration, common factor $H_0$ is the same as a selected one of the four transfer functions used in FIR filters 232a-232d. Common-factor monitor 240 can use any suitable selection criteria to select one of transfer functions $H_{xx}$, $H_{yx}$, $H_{xy}$, and $H_{yy}$.

In another configuration, common-factor monitor 240 is configured to determine common factor $H_0$ in accordance with Eq. (4):

$$H_0 = (H_{xx}H_{yy} - H_{yx}H_{xy})^{0.5} \quad (4)$$

Based on these two examples, one of ordinary skill in the art will understand that other configurations of common-factor monitor 240 are also possible. Accordingly, common-factor monitor 240 may be configured to determine common factor $H_0$ for changing one or more parameters of signal-equalization processing in first signal equalizer 220 based on one or more parameters of further signal-equalization processing in second signal equalizer 230.

At step 304, controller 250 receives, via signal 242, common factor $H_0$ from common-factor monitor 240 and (re)configures bulk signal equalizer 220, via control signal 252, to apply the received common factor in its signal-equalization processing. For example, controller 250 can (i) reconfigure subunit 222x so that its new transfer function is the previously used transfer function multiplied by the received common factor $H_0$, and (ii) reconfigure subunit 222y so that its new transfer function is the previously used transfer function multiplied by the received common factor $H_0$. This reconfiguration can typically be done in a relatively straightforward manner for at least two reasons. The first reason is that bulk signal equalizer 220 typically has a much larger signal-equalization capacity than any of FIR filters 232a-232d. The second reason is that bulk signal equalizer 220 is typically designed to have a signal-equalization capacity that exceeds the amount of CD and/or other signal impairments normally imposed on signal 102 by the corresponding optical transport link. As a result, bulk signal equalizer 220 can relatively easily accommodate the additional signal-equalization load corresponding to common factor $H_0$.

At step 306, controller 254 similarly receives, via signal 242, common factor $H_0$ from common-factor monitor 240 and (re)configures butterfly equalizer 230, via control signal 256, to scale each of the individual transfer functions used in FIR filters 232a-232d by common factor $H_0$. More specifically, at the beginning of step 306, the transfer function of butterfly equalizer 230, as a whole, is represented by matrix $\Xi$ given by Eq. (5):

$$\Theta = \begin{bmatrix} H_{xx} & H_{xy} \\ H_{yx} & H_{yy} \end{bmatrix} \quad (5)$$

At the end of step 306, the transfer function of butterfly equalizer 230 is represented by matrix $\Xi'$ given by Eq. (6):

$$\Theta' = \begin{bmatrix} \dfrac{H_{xx}}{H_0} & \dfrac{H_{xy}}{H_0} \\ \dfrac{H_{yx}}{H_0} & \dfrac{H_{yy}}{H_0} \end{bmatrix} \quad (6)$$

Note that Eq. (4) includes an expression for the determinant of matrix $\Xi$ (see Eq. (5)). This means that the (re)configuration of butterfly equalizer 230 with the common factor expressed by Eq. (4) is feasible only when matrix $\Xi$ is not degenerate (i.e., when the determinant of matrix $\Xi$ is not zero). In general, a typical optical communication system satisfies the latter condition.

One of ordinary skill in the art will appreciate that steps 304 and 306 are performed in a manner that enables DSP 200 not to throw off the equalized signals 268x and 268y during the update process. For example, the re-configuration may occur within a single signaling interval (symbol period), which means that steps 304 and 306 are carried out substantially concurrently. Alternatively, the re-configuration may occur over multiple signaling intervals, but in multiple relatively small increments so that the equalized signals 268x and 268y remain well equalized during the transition period from the old configurations of bulk signal equalizer 220 and butterfly equalizer 230 to the respective new ones.

At step 308, controller 250 keeps the configuration of bulk signal equalizer 220 static while dynamically changing the configuration of butterfly equalizer 230 to reflect the changes in the conditions of the optical-transport link occurring on the microsecond-to-millisecond time scale. On this time scale, the optical transport link primarily has changes in its polarization-rotation properties, PMD, and PDL. These changes can be appropriately addressed by reconfiguring butterfly equalizer 230 alone, without changing the configuration of bulk signal equalizer 220. In one embodiment, step 308 has a fixed duration, and the processing of method 300 is directed back to step 302 after the timer corresponding to step 308 has run out.

Figure 4:
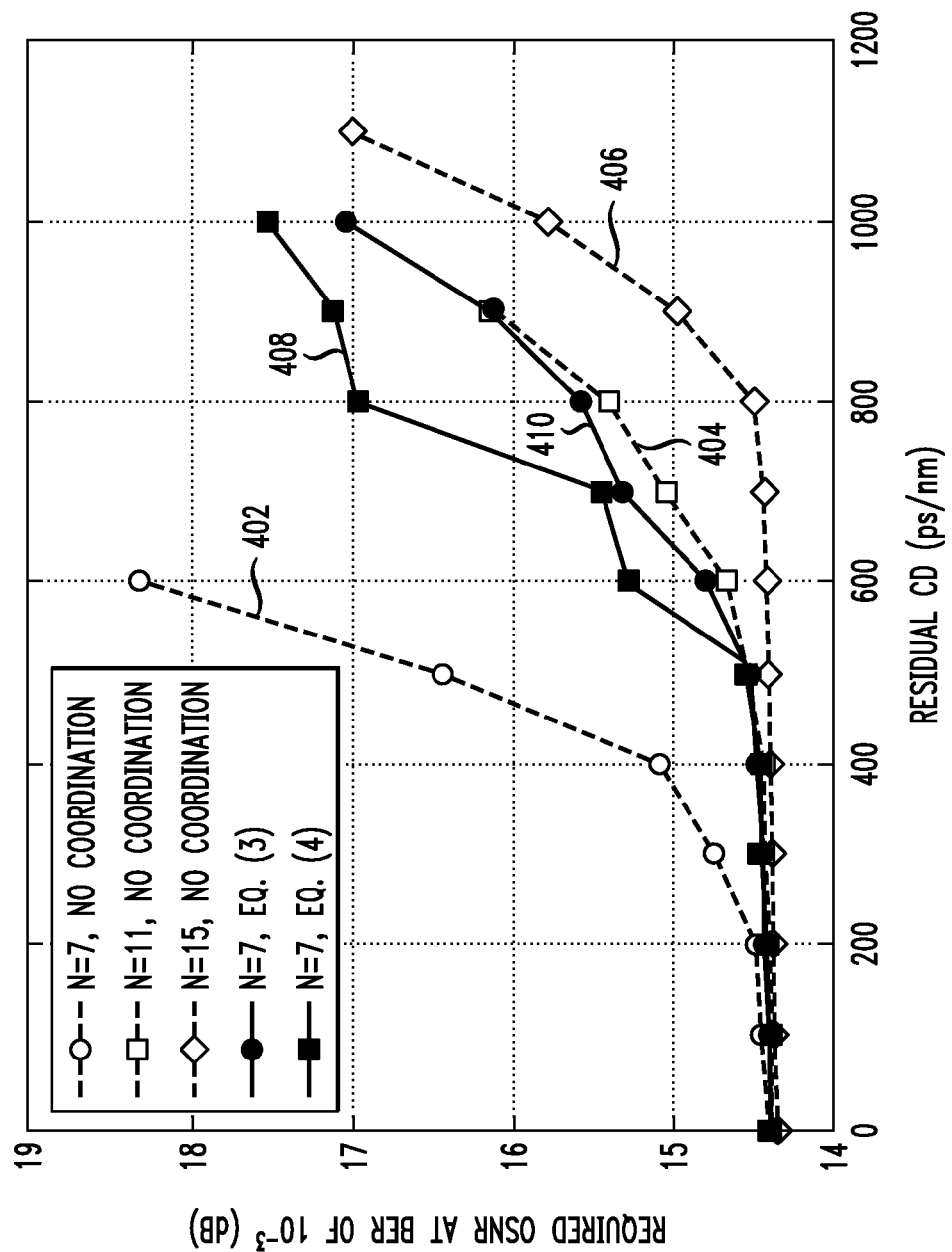
FIG. 4 graphically compares the performance of different configurations/embodiments of the digital signal processor shown in FIG. 2.

FIG. 4 graphically compares the performance of different configurations/embodiments of receiver 100 (FIG. 1) having DSP 200 (FIG. 2). More specifically, each data point in FIG. 4 shows an optical signal-to-noise ratio (OSNR) that is required for butterfly equalizer 230 to be able to substantially fully compensate the residual amount of CD corresponding to the abscissa of the data point. Hollow data points correspond to the configurations of DSP 200 in which common-factor monitor 240 is disabled, and there is no coordination between the two algorithms that are used to determine the configurations of bulk signal equalizer 220 and butterfly equalizer 230, respectively. Solid data points correspond to the configurations of DSP 200 in which common-factor monitor 240 is enabled. Other pertinent details for the data sets shown in FIG. 4 can be found in the legend box therein.

Comparison of the results corresponding to the hollow data points (curves labeled 402, 404, and 406 in FIG. 4) reveals that, for a fixed OSNR value, progressively larger sizes of FIR filters 232a-232d (larger N in FIG. 2B) enable the receiver to tolerate progressively larger amounts of residual CD. Further comparison of the results corresponding to curve 402 with the results corresponding to the filled data points (curves labeled 408 and 410 in FIG. 4) reveals that, if the size of FIR filters 232a-232d is fixed, then turning ON common-factor monitor 240 and the corresponding coordination between the two algorithms that are used to configure bulk signal equalizer 220 and butterfly equalizer 230, respectively, significantly improves the receiver tolerance to residual CD. Similar benefits are also observed with respect to the receiver tolerance to PMD.

Figure 5:
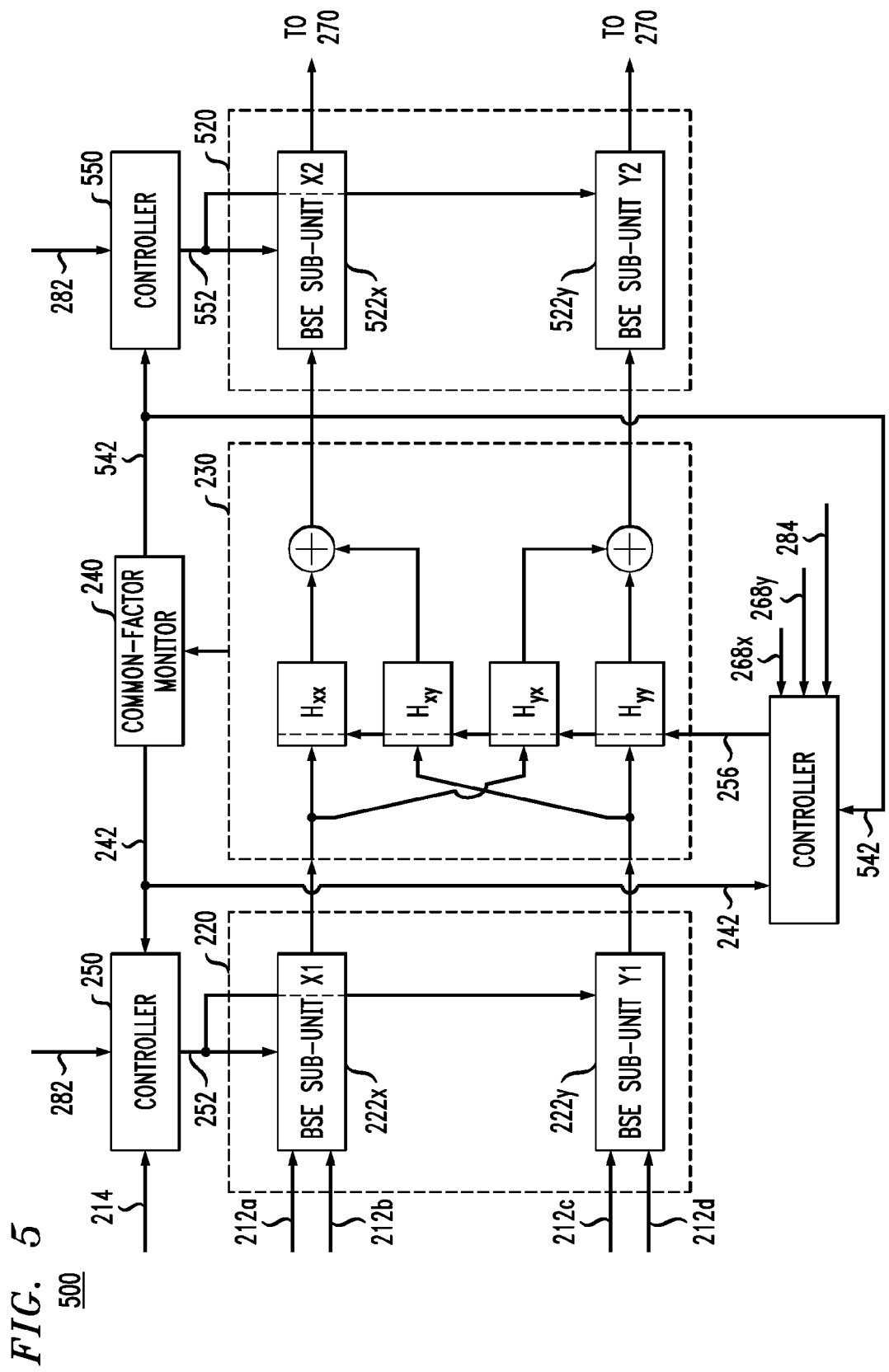
FIG. 5 shows a block diagram of a digital circuit that can be used to implement the digital signal processor shown in FIGS. 2A-2B according to another embodiment of the disclosure.

FIG. 5 shows a block diagram of a digital circuit 500 that can be used to implement DSP 200 according to another embodiment of the disclosure. More specifically, circuit 500 can be used in DSP 200 (see FIG. 2A) to replace the circuitry located between modules 210 and 270. Compared to the circuit that it replaces, circuit 500 has an additional bulk signal equalizer 520 and a corresponding controller 550.

Bulk signal equalizer 520 can be generally similar to bulk signal equalizer 220 and, in one embodiment, has two BSE sub-units 522x and 522y that are generally similar to BSE sub-units 222x and 222y, respectively. Controller 550 is generally similar to controller 250 and is configured to control the configurations of BSE sub-units 522x and 522y using a control signal 552. Controller 550 generates control signal 552 based on a signal 542 generated by common-factor monitor 240. In one embodiment, signal 542 can be generally analogous to signal 242.

One difference between circuit 500 and the corresponding portion of DSP 200 (see FIG. 2A) is that circuit 500 can use multiple common factors for configuring bulk signal equalizers 220 and 520. For example, a first common factor ($H_1$) may be determined by monitor 240 based on transfer functions $H_{xx}$ and $H_{yx}$. Controller 250 can then be used to transfer common factor $H_1$ to BSE sub-unit 222x. A second common factor ($H_2$) may be determined by monitor 240 based on transfer functions $H_{yy}$ and $H_{xy}$. Controller 250 can then be used to transfer common factor $H_2$ to BSE sub-unit 222y. A third common factor ($H_3$) may be determined by monitor 240 based on transfer functions $H_{xx}$ and $H_{xy}$. Controller 550 can then be used to transfer common factor $H_3$ to BSE sub-unit 522x. A fourth common factor ($H_4$) may be determined by monitor 240 based on transfer functions $H_{yy}$ and $H_{yx}$. Controller 550 can then be used to transfer common factor $H_4$ to BSE sub-unit 522y.

One of ordinary skill in the art will appreciate that method 300, with appropriate modifications pertaining to the use of four common factors $H_1$-$H_4$ instead of a single common factor $H_0$, can be used to operate a modified DSP including circuit 500.

While this invention has been described with reference to illustrative embodiments, this description is not intended to be construed in a limiting sense.

Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention.

What is claimed is:

1. An apparatus comprising:
   an optical-to-electrical converter configured to mix an optical input signal having a first polarization component and a second polarization component with an optical local-oscillator (LO) signal to generate a first plurality of electrical digital measures of the optical input signal; and
   a digital processor configured to process the first plurality of electrical digital measures to recover respective data carried by the first polarization component and the second polarization component of the optical input signal, wherein the digital processor comprises:
      a first signal equalizer configured to apply signal-equalization processing to the first plurality of electrical digital measures to generate a second plurality of electrical digital measures of the optical input signal; and
      a second signal equalizer configured to apply further signal-equalization processing to the second plurality of electrical digital measures; and
   wherein the digital processor is configured to change one or more parameters of the signal-equalization processing in the first signal equalizer based on one or more parameters of the further signal-equalization processing in the second signal equalizer; and
   wherein the second signal equalizer comprises:
      a first finite-impulse-response filter configured to have a first transfer function to implement a first respective part of said further signal-equalization processing; and
      a second finite-impulse-response filter configured to have a second transfer function to implement a second respective part of said further signal-equalization processing, wherein the digital processor is configured to:
         determine a common factor corresponding to the first and second transfer functions;
         reconfigure the first signal equalizer to apply the common factor in the signal-equalization processing performed therein; and
         change the first transfer function and the second transfer function by scaling each of the first transfer function and the second transfer function using the common factor.

2. The apparatus of claim 1, wherein the first signal equalizer comprises a dispersion compensator, and the signal-equalization processing includes dispersion-compensation processing.

3. The apparatus of claim 2, wherein the further signal-equalization processing includes further dispersion-compensation processing and polarization de-multiplexing.

4. The apparatus of claim 3, wherein the further dispersion-compensation processing includes polarization-mode-dispersion-compensation processing and chromatic-dispersion-compensation processing.

5. The apparatus of claim 1, wherein the second signal equalizer is configured to mix electrical digital measures of the second plurality of electrical digital measures with one another to generate a first digital signal corresponding to the first polarization component and a second digital signal corresponding to the second polarization component.

6. The apparatus of claim 1, wherein:
   the second signal equalizer further comprises:
      a third finite-impulse-response filter configured to have a third transfer function to implement a third respective part of said further signal-equalization processing; and
      a fourth finite-impulse-response filter configured to have a fourth transfer function to implement a fourth respective part of said further signal-equalization processing, wherein the digital processor is configured to determine the common factor so that it also corresponds to the third and fourth transfer functions; and the digital processor is further configured to change the third transfer function and the fourth transfer function by scaling each of the third transfer function and the fourth transfer function using the common factor.

7. The apparatus of claim 6, wherein the common factor is based on a determinant of a 2×2 matrix having the first, second, third, and fourth transfer functions as respective matrix elements.

8. The apparatus of claim 6, wherein the common factor is a selected one of the first, second, third, and fourth transfer functions.

9. The apparatus of claim 6, wherein:

the first finite-impulse-response filter is configured to apply the first transfer function to a first electrical digital measure of the second plurality of electrical digital measures to generate a first electrical digital measure of a third plurality of electrical digital measures of the optical input signal;

the second finite-impulse-response filter is configured to apply the second transfer function to a second electrical digital measure of the second plurality of electrical digital measures to generate a second electrical digital measure of the third plurality of electrical digital measures;

the third finite-impulse-response filter is configured to apply the third transfer function to the first electrical digital measure of the second plurality of electrical digital measures to generate a third electrical digital measure of the third plurality of electrical digital measures;

the fourth finite-impulse-response filter is configured to apply the fourth transfer function to the second electrical digital measure of the second plurality of electrical digital measures to generate a fourth electrical digital measure of the third plurality of electrical digital measures; and the signal equalizer further comprises:

a first adder configured to sum the first and second electrical digital measures of the third plurality of electrical digital measures to generate a first digital signal corresponding to the first polarization component; and a second adder configured to sum the third and fourth electrical digital measures of the third plurality of electrical digital measures to generate a second digital signal corresponding to the second polarization component.

10. The apparatus of claim 9, further comprising a decoder configured to:

recover the data carried by the first polarization component based on the first digital signal; and recover the data carried by the second polarization component based on the second digital signal.

11. An apparatus comprising a digital processor configured to (i) receive a first plurality of electrical digital measures generated by mixing an optical input signal having a first polarization component and a second polarization component with an optical local-oscillator signal and (ii) process the first plurality of electrical digital measures to recover respective data carried by the first polarization component and the second polarization component of the optical input signal, wherein the digital processor comprises:

a first signal equalizer configured to apply signal-equalization processing to the first plurality of electrical digital measures to generate a second plurality of electrical digital measures of the optical input signal;

a second signal equalizer configured to apply further signal-equalization processing to the second plurality of electrical digital measures;

a decoder configured to recover the respective data based on the second plurality of electrical digital signals; and a controller configured to change one or more parameters of the signal-equalization processing in the first signal equalizer based on one or more parameters of the further signal-equalization processing in the second signal equalizer, wherein:

the first signal equalizer comprises a dispersion compensator;

the signal-equalization processing includes dispersion-compensation processing; and the further signal-equalization processing includes further dispersion-compensation processing and polarization de-multiplexing.

12. The apparatus of claim 11, wherein the further dispersion-compensation processing includes polarization-mode-dispersion-compensation processing and chromatic-dispersion-compensation processing.

13. A method of processing a first plurality of electrical digital measures generated by mixing an optical input signal having a first polarization component and a second polarization component with an optical local-oscillator signal for recovering respective data carried by the first polarization component and the second polarization component of the optical input signal, the method comprising:

applying signal-equalization processing to the first plurality of electrical digital measures in a first signal equalizer to generate a second plurality of electrical digital measures of the optical input signal;

applying further signal-equalization processing to the second plurality of electrical digital measures in a second signal equalizer;

changing one or more parameters of the signal-equalization processing in the first signal equalizer based on one or more parameters of the further signal-equalization processing in the second signal equalizer; and recovering the respective data based on the second plurality of electrical digital signals, wherein:

the signal-equalization processing includes dispersion-compensation processing; and the further signal-equalization processing includes further dispersion-compensation processing and polarization de-multiplexing.

14. An apparatus comprising:

an optical-to-electrical converter configured to mix an optical input signal having a first polarization component and a second polarization component with an optical local-oscillator (LO) signal to generate a first plurality of electrical digital measures of the optical input signal; and a digital processor configured to process the first plurality of electrical digital measures to recover respective data carried by the first polarization component and the second polarization component of the optical input signal, wherein the digital processor comprises:

a first signal equalizer configured to apply signal-equalization processing to the first plurality of electrical digital measures to generate a second plurality of electrical digital measures of the optical input signal; and a second signal equalizer configured to apply further signal-equalization processing to the second plurality of electrical digital measures; and wherein the digital processor is configured to change one or more parameters of the signal-equalization processing in the first signal equalizer based on one or more parameters of the further signal-equalization processing in the second signal equalizer;

wherein the first signal equalizer comprises a dispersion compensator, and the signal-equalization processing includes dispersion-compensation processing; and wherein the further signal-equalization processing includes further dispersion-compensation processing and polarization de-multiplexing.

15. The apparatus of claim 14, wherein the further dispersion-compensation processing includes polarization-mode-dispersion-compensation processing and chromatic-dispersion-compensation processing.

16. An apparatus comprising:
an optical-to-electrical converter configured to mix an optical input signal having a first polarization component and a second polarization component with an optical local-oscillator (LO) signal to generate a first plurality of electrical digital measures of the optical input signal; and a digital processor configured to process the first plurality of electrical digital measures to recover respective data carried by the first polarization component and the second polarization component of the optical input signal, wherein the digital processor comprises:
a first signal equalizer configured to apply signal-equalization processing to the first plurality of electrical digital measures to generate a second plurality of electrical digital measures of the optical input signal; and
a second signal equalizer configured to apply further signal-equalization processing to the second plurality of electrical digital measures; and
wherein the digital processor is configured to change one or more parameters of the signal-equalization processing in the first signal equalizer based on one or more parameters of the further signal-equalization processing in the second signal equalizer; and
wherein the second signal equalizer is configured to mix electrical digital measures of the second plurality of electrical digital measures with one another to generate a first digital signal corresponding to the first polarization component and a second digital signal corresponding to the second polarization component.

17. The apparatus of claim 16, further comprising a decoder configured to:
recover the data carried by the first polarization component based on the first digital signal; and
recover the data carried by the second polarization component based on the second digital signal.

18. The apparatus of claim 16, further comprising a third signal equalizer configured to apply still further signal-equalization processing to the first and second digital signals received from the second signal equalizer, wherein the digital processor is configured to change one or more parameters of said still further signal-equalization processing in the third signal equalizer based on one or more parameters of the further signal-equalization processing in the second signal equalizer.

19. The apparatus of claim 18, wherein the second signal equalizer comprises:
a first finite-impulse-response filter configured to have a first transfer function to implement a first respective part of said further signal-equalization processing; and
a second finite-impulse-response filter configured to have a second transfer function to implement a second respective part of said further signal-equalization processing, wherein the digital processor is configured to:
determine a first common factor corresponding to the first and second transfer functions;
reconfigure the third signal equalizer to apply the first common factor in the signal-equalization processing performed therein; and
change the first transfer function and the second transfer function by scaling each of the first transfer function and the second transfer function using the first common factor.

20. The apparatus of claim 19, wherein the second signal equalizer further comprises a third finite-impulse-response filter configured to have a third transfer function to implement a third respective part of said further signal-equalization processing, wherein the digital processor is configured to:
determine a second common factor corresponding to the first and third transfer functions;
reconfigure the first signal equalizer to apply the second common factor in the signal-equalization processing performed therein; and
change the first transfer function and the third transfer function by scaling each of the first transfer function and the third transfer function using the second common factor.

21. The apparatus of claim 20, wherein the second signal equalizer further comprises a fourth finite-impulse-response filter configured to have a fourth transfer function to implement a fourth respective part of said further signal-equalization processing, wherein the digital processor is configured to:
determine a third common factor corresponding to the second and fourth transfer functions;
reconfigure the first signal equalizer to apply the third common factor in the signal-equalization processing performed therein;
change the second transfer function and the fourth transfer function by scaling each of the second transfer function and the fourth transfer function using the third common factor;
determine a fourth common factor corresponding to the third and fourth transfer functions;
reconfigure the third signal equalizer to apply the fourth common factor in the signal-equalization processing performed therein; and
change the third transfer function and the fourth transfer function by scaling each of the third transfer function and the fourth transfer function using the fourth common factor.

* * * * *